United States Patent
Horman et al.

(10) Patent No.: US 9,268,621 B2
(45) Date of Patent: Feb. 23, 2016

(54) REDUCING LATENCY IN MULTICAST TRAFFIC RECEPTION

(75) Inventors: Neil R. T. Horman, Cary, NC (US); Eric L. Paris, Raleigh, NC (US); Jeffrey T. Layton, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 183 days.

(21) Appl. No.: 13/287,477

(22) Filed: Nov. 2, 2011

(65) Prior Publication Data

US 2013/0110968 A1 May 2, 2013

(51) Int. Cl.
*G06F 15/167* (2006.01)
*G06F 9/54* (2006.01)
*H04L 12/801* (2013.01)

(52) U.S. Cl.
CPC ............... *G06F 9/544* (2013.01); *H04L 47/15* (2013.01)

(58) Field of Classification Search
CPC ... H04L 69/162; H04L 47/10; H04L 63/0227; H04L 47/15; H04L 47/2416; H04L 47/2441; H04L 49/201; H04L 49/9021; H04L 49/9052; H04L 49/9078; G06F 9/544
USPC .................. 709/215; 710/52, 26, 56; 370/412
See application file for complete search history.

(56) References Cited

U.S. PATENT DOCUMENTS

| | | | | |
|---|---|---|---|---|
| 5,991,520 A * | 11/1999 | Smyers | ................... | G06F 13/10 710/100 |
| 6,032,207 A * | 2/2000 | Wilson | ............................. | 710/54 |
| 6,148,350 A * | 11/2000 | Chen et al. | ....................... | 710/62 |
| 6,328,217 B1 * | 12/2001 | Everett et al. | ................. | 235/492 |
| 7,522,599 B1 * | 4/2009 | Aggarwal et al. | ............. | 370/390 |
| 7,831,745 B1 * | 11/2010 | Eiriksson et al. | ............... | 710/22 |
| 8,270,395 B2 * | 9/2012 | Kompella | ..................... | 370/353 |
| 2002/0078135 A1 * | 6/2002 | Venkatsubra | ........... | H04L 63/08 709/202 |
| 2004/0017810 A1 * | 1/2004 | Anderson et al. | ............. | 370/390 |
| 2007/0183418 A1 * | 8/2007 | Riddoch et al. | ............... | 370/389 |
| 2009/0190474 A1 * | 7/2009 | Gahm et al. | .................. | 370/235 |
| 2012/0307838 A1 * | 12/2012 | Manula et al. | ................ | 370/412 |

OTHER PUBLICATIONS

Klaus Wehrle et al. "The Linux Networking Architecture: Design and Implementation of Network Protocols in the Linux Kernel" Aug. 1, 2004, Prentice Hall, 0-13-177720-3.*

* cited by examiner

*Primary Examiner* — Brian J Gillis
*Assistant Examiner* — Shean Tokuta
(74) *Attorney, Agent, or Firm* — Lowenstein Sandler LLP

(57) ABSTRACT

A computing device identifies a data packet received at a computing device. The computing device allocates memory having a fixed size to store the network data packet. A latency reducer identifies a free space in the memory allocation, the free space comprising a difference between the fixed size of the memory allocation and a size of the network data packet. The latency reducer creates a socket buffer list for the network data packet in the free space, the socket buffer list comprising a plurality of entries to serve as socket queue objects for a plurality of applications.

12 Claims, 7 Drawing Sheets

REDUCING LATENCY IN MULTICAST TRAFFIC RECEPTION

TECHNICAL FIELD

This disclosure relates to the field of network packet handling and, in particular, to opportunistic use of internally fragmented storage to reduce allocation latency in multicast traffic reception.

BACKGROUND

Many conventional operating systems have a similar approach to the handling of network traffic. For example, a frame or data packet may be received by a computing device over a network at a network interface card (NIC). An operating system running on the computing device may generate network buffer metadata for the received frame data. This metadata may be referred to as a socket buffer (SKB). The frame data may be passed through a network stack for processing and delivered to a single destination (e.g., a socket associated with a computer application program running on the computing device). As such, the socket buffer is designed to only allow enqueuing to a single destination queue (e.g., a socket queue).

In some cases, a received data packet may be multicast (i.e., intended to be delivered to multiple destinations within the computing device). For example, multiple computer application programs may listen to a single multicast group, and each data packet received for that group must be delivered to each computer application program. To support enqueuing to multiple destination queues, the operating system may clone (e.g., copy) the socket buffer as many times as necessary. Each clone may include pointers to the same frame data, and one clone of the socket buffer may be added to the socket queue for each destination. Cloning the socket buffer, however, requires a relatively slow memory allocation and copy operation. Locking may also be needed to provide mutual exclusion. In addition, since network packet delivery is serialized to prevent re-ordering, this may create a bottleneck in packet processing, leading to an increasing performance degradation as more applications listen on the same multicast group.

BRIEF DESCRIPTION OF THE DRAWINGS

The present disclosure is illustrated by way of example, and not by way of limitation, in the figures of the accompanying drawings.

DETAILED DESCRIPTION

Figure 1:
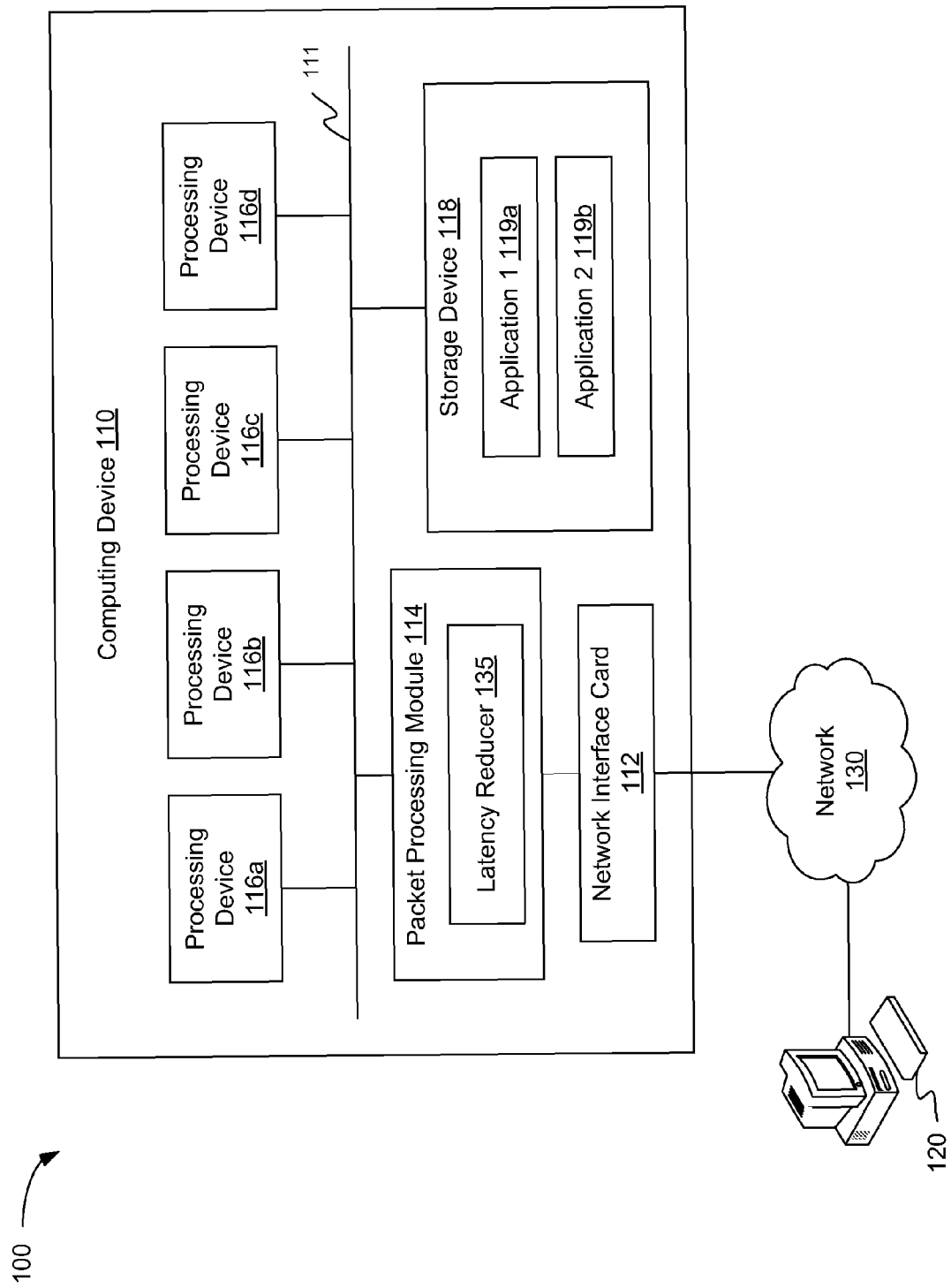
FIG. 1 is a block diagram illustrating a computing environment for reducing latency in multicast traffic reception, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for reducing latency in multicast traffic reception. In one embodiment, a computing device identifies a multicast data packet addressed to a plurality of applications in the computing device. The computing device allocates memory having a fixed size to store the multicast network data packet. A latency reducer identifies a free space in the memory allocation, the free space including a difference between the fixed size of the memory allocation and a size of the multicast network data packet. The latency reducer may create a socket buffer list for the multicast network data packet in the free space. The socket buffer list may include a plurality of entries to serve as socket queue objects for the plurality of applications.

In one embodiment, the socket buffer list also includes a count value representing a number of available entries in the socket buffer list and a pointer to a socket buffer corresponding to the multicast network data packet. The socket buffer may include metadata associated with the multicast network data packet. Each entry of the plurality of entries in the socket buffer list includes a key mapping value to identify a socket queue associated with one of the plurality of applications, a next pointer value to identify a subsequent object in the socket queue, and a previous pointer value to identify a prior object in the socket queue. Each entry of the plurality of entries in the socket buffer list may be enqueued in a socket queue associated with one of the plurality of applications so that the application may perform application specific processing on the associated multicast network data packet.

The latency reduction techniques described prevent the need to clone the socket buffer by making a copy for each destination socket queue. Such a cloning process requires a time consuming memory allocation and copy process that can cause latency in the processing of network data packets. Instead, the latency reducer makes opportunistic use of internally fragmented storage by creating the socket buffer list using extra space in the memory allocation. The entries in the socket buffer list include only the information necessary to enqueue the entries in a socket queue without unnecessarily duplicating additional information in the socket buffer. This can mitigate performance degradation caused by conventional multicast traffic reception techniques.

FIG. 1 is a block diagram illustrating a computing environment for reducing latency at a network interface card, according to an embodiment of the present invention. In one embodiment, network environment 100 includes computing device 110 and one or more network devices 120. Computing device 110 may include, for example, computer system 700 of FIG. 7. Network device 120 may be any other device connected to computing device 110 through network 130.

Network device 120, may be for example, another computing device, a client device, a server device, a user device, or some other device. Network 130 may be any type of data network configured to connect multiple computing devices, such as for example, a local area network (LAN), a wide area network (WAN), a global area network (GAN) such as the Internet, or a combination of such networks. In another embodiment, network device 120 may have a direct connection to computing device 110 and any other devices in the computing environment 100. The illustrated embodiment shows one computing device 110 and one network device 120, however, in other embodiments, there may be any number of computing devices 110 or network devices 120, and environment 100 may include additional and/or different devices.

In one embodiment, computing device 110 may include network interface card 112, packet processing module 114, one or more processing devices 116a-116d, and storage device 118. These various components of computing device 110 may be connected together via bus 111. Bus 111 may be a common system bus, including one or more different buses, or may be one or more single signal lines between individual system components.

In one embodiment, network traffic may be received by computing device 110 over network 130 from network device 120. The network traffic may include a series of data frames or packets which are received at network interface card 112. Network interface card (NIC) 112 may be a computer hardware component including electronic circuitry to communicate using a specific physical layer and data link layer standard such as Ethernet, Wi-Fi, etc. The network interface card 112 may be the base of a network protocol stack, allowing communication among computing devices through routable protocols, such as Internet Protocol (IP). In one embodiment, the received data packet may be a multicast data packet received on a specific multicast port. A multicast packet may be addressed to multiple destinations (e.g., applications) within computing device 110. For example, when a socket is opened for a certain application, the socket may subscribe to a multicast address. Multiple sockets may be subscribed to the address and any data received at that address may be forwarded to each subscribed socket. In one embodiment, an operating system on computing device 110 may maintain a list of each subscribed socket for a particular multicast address to enable the forwarding of multicast data packets.

A received data packet may be subject to certain packet processing, such as passing the received data packet through a network protocol stack. Once the packet processing is complete, an application, such as one of applications 119a-119b may take over processing of the data packet. The applications 119a-119b may be stored, for example, in storage device 118. Storage device 118 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

In one embodiment, packet processing module 114 may include latency reducer 135. Latency reducer 135 may implement a method, as described below, to reduce the latencies present in conventional packet processing techniques. As will be described in further detail below with respect to FIGS. 2-6, in some embodiments, latency reducer 135 may make opportunistic use of internally fragmented storage by creating a socket buffer list using extra space in a memory allocation.

Figure 2:
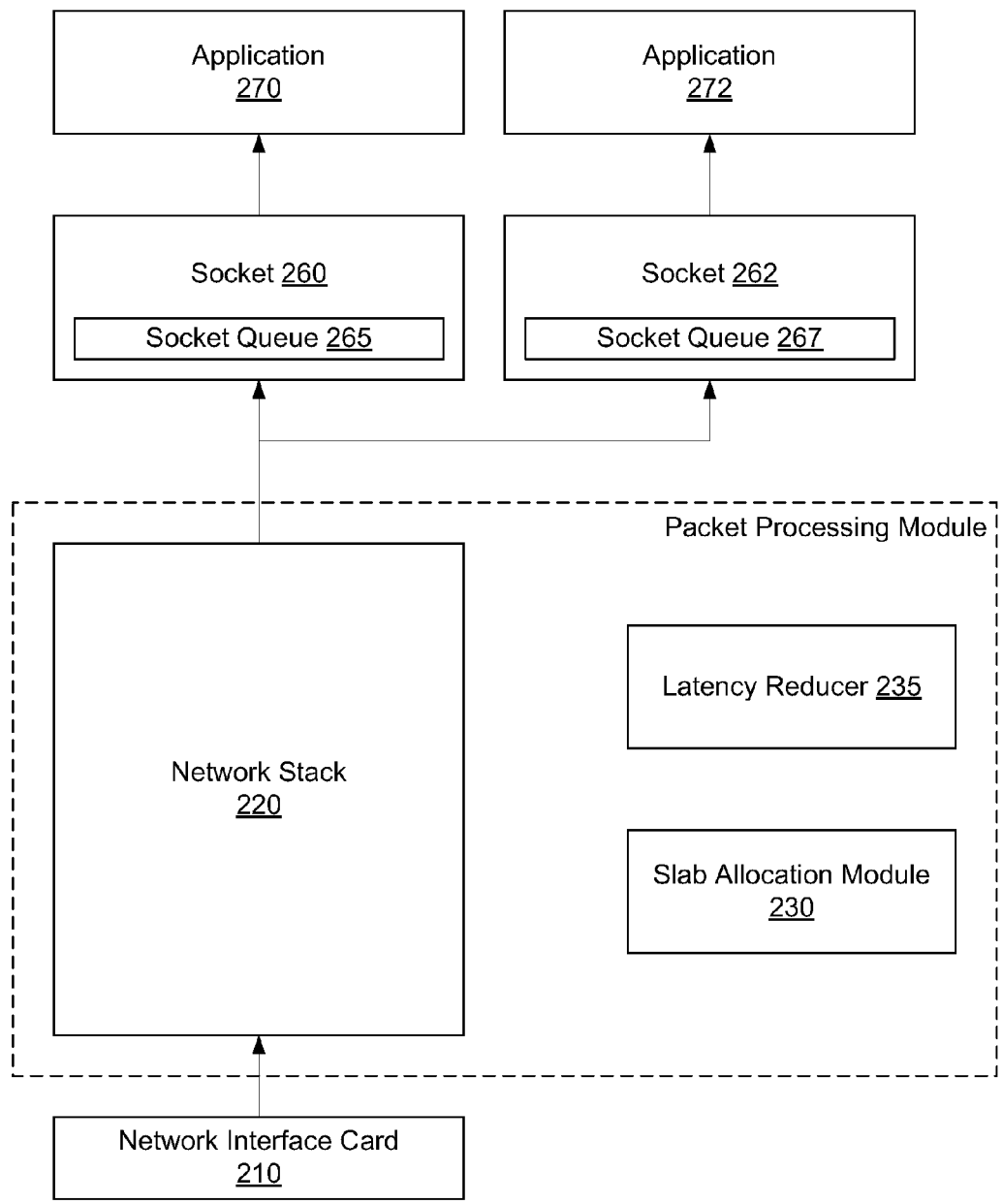
FIG. 2 is a block diagram illustrating a network packet processing flow for reducing latency in multicast traffic reception, according to an embodiment.

FIG. 2 is a block diagram illustrating network packet processing flow for reducing latency in multicast traffic reception, according to an embodiment of the present invention.

The various modules and components may be described in regards to their roles in processing a received network packet or packets. In one embodiment, network interface card 210 receives a multicast network packet from a network, such as network 130 of FIG. 1. The multicast network packet may be received on a certain port, designated to receive multicast packets.

Upon receiving the network packet, containing data which may be referred to as frame data, the network packet may be passed through network stack 220 to one or more subscribed sockets 260, 262. Network stack 220 processes data, such as frame data from the network packet, to deliver it to its destinations. During processing, the frame data may be stored at a location in memory, such as in storage device 118 of FIG. 1, allocated by slab allocation module 230. Slab allocation is a memory management mechanism intended for the efficient memory allocation of kernel objects which eliminates fragmentation caused by conventional allocations. Slab allocation module 230 may preallocate memory chunks of a certain fixed size. The memory chunks may be, for example, 32 bytes, 64 bytes, 128, bytes, 256, bytes, etc., continuing in sizes having powers of two. In other embodiments, the memory chunks may be allocated in some other predetermined or arbitrary size. If a data packet is received of a certain size, slab allocation module 230 may allocate the next largest memory chunk to store the frame data and any associated metadata, such as shared socket buffer information. For example, if the frame data is 1000 bytes and the associated shared socket buffer information is 100 bytes, slab allocation module 230 may allocate a memory chunk of 2048 bytes. The remaining 948 bytes may be termed "extra space" and may be used by latency reducer 235 for opportunistic use of internally fragmented storage to reduce allocation latency in multicast traffic reception.

Sockets 260, 262 are the means by which an application, such as application 270 or 272, interacts with network stack 220. Applications 270, 272 may read data from or write data to sockets 260, 262, respectively. In one embodiment, a socket buffer (SKB) containing metadata about the received frame data may be generated and added to a socket queue 265, 267 for each destination socket. The socket queue may include, for example, a linked list or other data structure. Each object (e.g., the socket buffer) in the linked list may include a pointer to a next object in the list, and may optionally include a pointer to a previous object in the list. Applications 270, 272 can retrieve the network packet from sockets 260, 262 for additional application specific processing according to the next object in the socket queue 265, 267.

In one embodiment, latency reducer 235 can identify the extra space in the slab allocation and format that space to create a socket buffer list. The socket buffer list can include a number of entries that can be used as socket queue objects for socket queues 265, 267. There may be one entry for each socket to which the frame data is being multicast. Since the socket buffer list occupies the extra space in the slab allocation, no additional memory space is required. This may prevent the need to clone multiple socket buffers, which can be a time consuming and resource intensive process.

Figure 3:
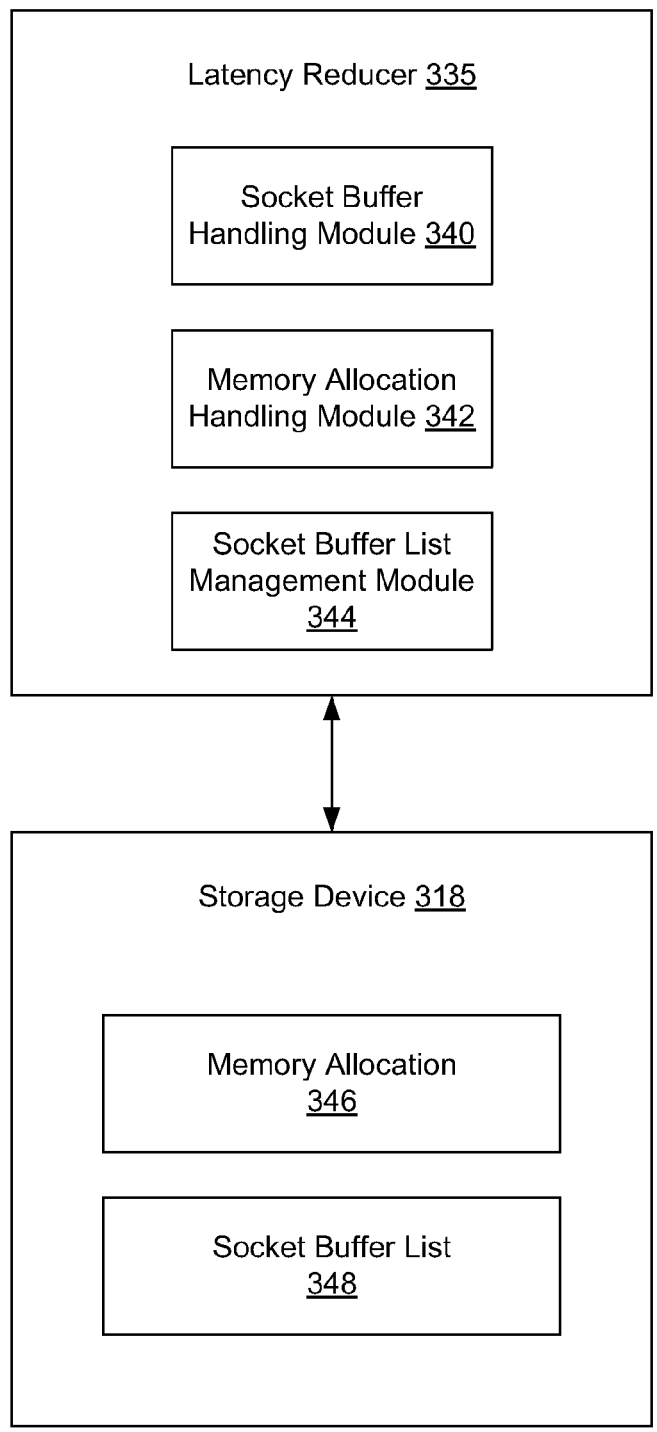
FIG. 3 is a block diagram illustrating a latency reducer, according to an embodiment.

FIG. 3 is a block diagram illustrating a latency reducer, according to an embodiment of the present invention. In one embodiment, latency reducer 335 runs packet processing module 114, as shown in FIG. 1. In one embodiment, latency reducer 335 includes socket buffer handling module 340, memory allocation handling module 342 and socket buffer list management module 344. Latency reducer 335 may be coupled to storage device 318, which includes memory allocation space 346 and socket buffer list 348. In one embodiment, storage device 318 may be representative of storage device 118, as discussed above with respect to FIG. 1.

Figure 4:
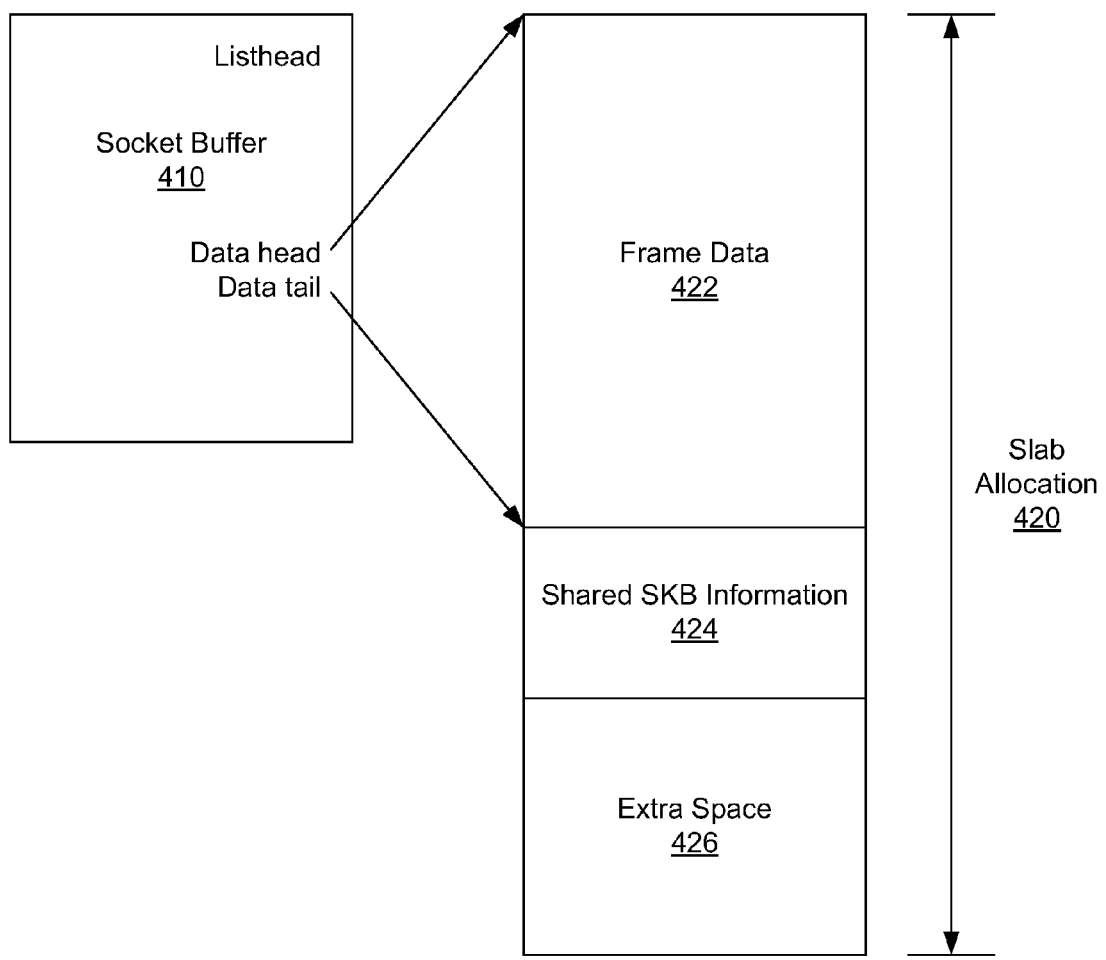
FIG. 4 is block diagram illustrating a memory allocation structure, according to an embodiment.

Latency reducer 335 can opportunisticly use available internally fragmented storage to reduce allocation latency in multicast traffic reception. In one embodiment, upon receiving a multicast data packet at the network interface card 210 socket buffer handling module 340 generates a socket buffer containing metadata about the received frame data. One example of the socket buffer is shown in FIG. 4. In FIG. 4, socket buffer 410 may be formed at a location in memory allocated by slab allocation module 230. This location may be part of the memory allocation 346, shown in storage device 318 of FIG. 3. Socket buffer 410 may contain metadata, such as for example, a head and tail location of the corresponding frame data 422, a listhead and other information. The listhead may include pointers, such as next and previous pointers, that may be used as socket queue objects in socket queues 265, 267. Socket buffer handling module 340 may also generate shared socket buffer information 424. In certain embodiments, where multiple socket buffers are generated, the shared socket buffer information 424 contains additional metadata used and managed by the operating system to provide safe access to frame data 422 when the multiple socket buffers are all pointing to the same frame data 422 at once. In one embodiment, shared SKB information 424 is located in a memory allocation immediately adjacent to frame data 422.

Referring back to FIG. 3, memory allocation handling module 342 may identify any extra space in the memory allocation 346. As illustrated in FIG. 4, the extra space 426 may include any additional space in the slab allocation 420 that is not occupied by the frame data 422 and shared socket buffer information 424. Memory allocation handling module 342 may query slab allocation module 230 to determine the size of the slab allocation 420. Memory allocation handling module 342 may also identity the size of frame data 422 and shared SKB information 424 from socket buffer handling module 340. By subtracting the size of the frame data 422 and shared SKB information 424 from the size of slab allocation 420, memory allocation handling module 342 can identify the size of extra space 426. This extra space 426 may ultimately be used to create a socket buffer list 348, that can be used to reduce latency in multicast traffic reception.

Figure 5A:
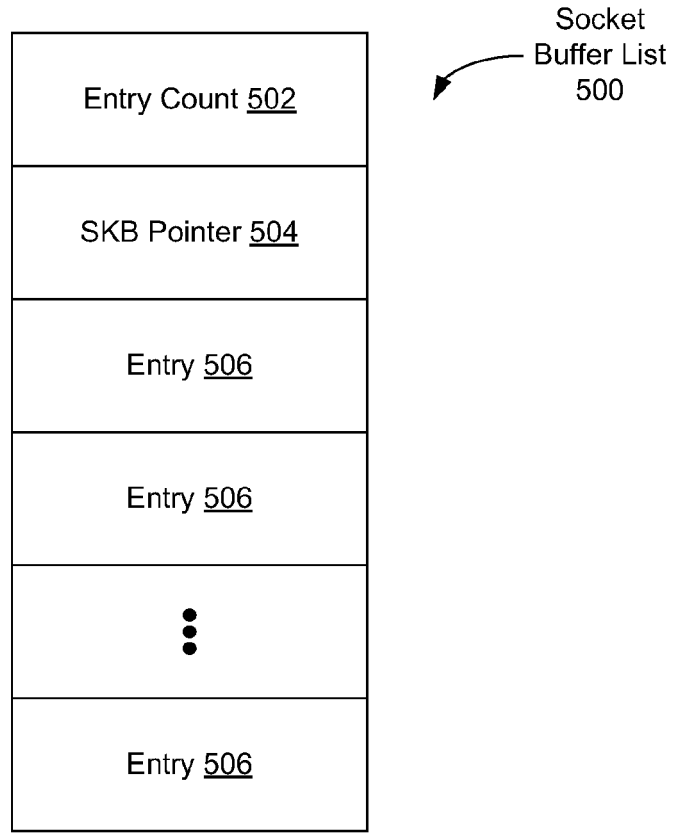
FIG. 5A is a block diagram illustrating a socket buffer list structure, according to an embodiment.

Socket buffer list management module 344 may format extra space 426 to generate socket buffer list 348. An example of one possible arrangement of socket buffer list 348 is illustrated in FIG. 5A. In FIG. 5A, socket buffer list 500 includes entry count value 502, socket buffer pointer 504 and one or more socket buffer list entries 506. Entry count value 502 may include a representation of a number of available entries 506 in socket buffer list 500. Since the size of socket buffer list 500 is known (i.e., the size of the extra space 426 determined by memory allocation handling module) and each entry 506 has a fixed format and size, the number of possible entries in socket buffer list 500 can be determined. This number may be stored as the initial value of entry count 502. As new entries are added to socket buffer list 500, the size of an entry 506 may be multiplied by the number of entries to determine the location in socket buffer list 500 for the new entry. An entry 506 may be created at that location and the value of entry count 502 decremented to reflect the number of remaining entries in the queue.

SKB pointer 504 may include an indication of the location of the actual socket buffer, such as socket buffer 410, associated with the frame data 422 and socket buffer list 500. As described above, the socket buffer 410 may be located in a memory allocation 346 in storage device 318. The socket buffer pointer 504 may have a value referencing that location.

When entries 506 are added to socket queues, such as socket queues 265, 267, the corresponding applications 270, 272 can reference socket buffer 410 using the value of socket buffer pointer 504.

Figure 5B:
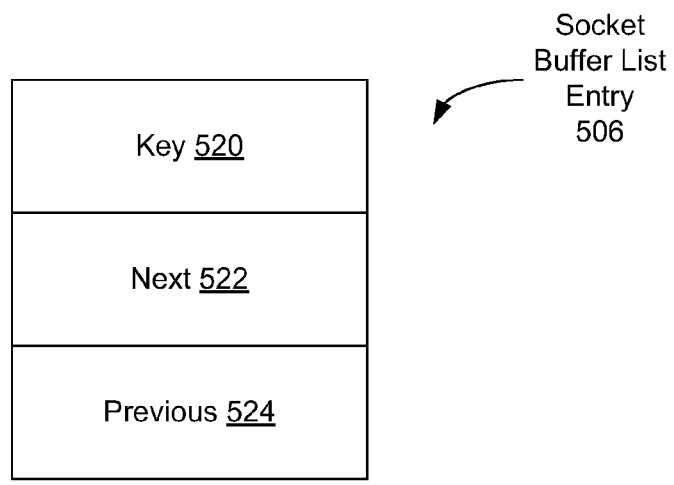
FIG. 5B is a block diagram illustrating a socket buffer list entry structure, according to an embodiment.

Each entry 506 in socket buffer list 500 may have a fixed format, including information allowing the entry 506 to serve as a socket queue object for socket queues 265, 267. In one embodiment, the entries may be preformatted and the values initialized to zero or some other placeholder value. In another embodiment, each entry 506 may be created as needed. This information may be similar to the listhead information in socket buffer 410, without including all of the additional information in the socket buffer 410. FIG. 5B illustrates the format of an socket buffer list entry 506, according to one embodiment. Each entry 506 may include a key value 520, a next value 522, and a previous value 524. Key value 520 may include a mapping value to identify the socket queue, such as socket queue 265 or 267, to which the entry 506 has been assigned. In one embodiment, this value may include an address of a buffer head of the socket queue. The next 522 and previous 524 values may be similar to those in the listhead of socket buffer 410. Upon being added to a socket queue 265, 267, socket buffer list management module 344 may write a value to next 522 and previous 524 representing the adjacent socket queue objects in the socket queue 265, 267. The next value 522 may include a pointer to the location or identifier of a subsequent object in the queue and the previous value 524 may include a pointer to the location or identifier of a prior object in the queue. In this fashion, the socket queue objects (e.g., entries 506) may form a circular linked list or other data structure. Applications 270, 272 associated with the sockets 260, 262 and socket queues 265, 267 may dequeue the entries 506 to perform application specific processing on the associated socket buffer 410 and frame data 422.

Figure 6:
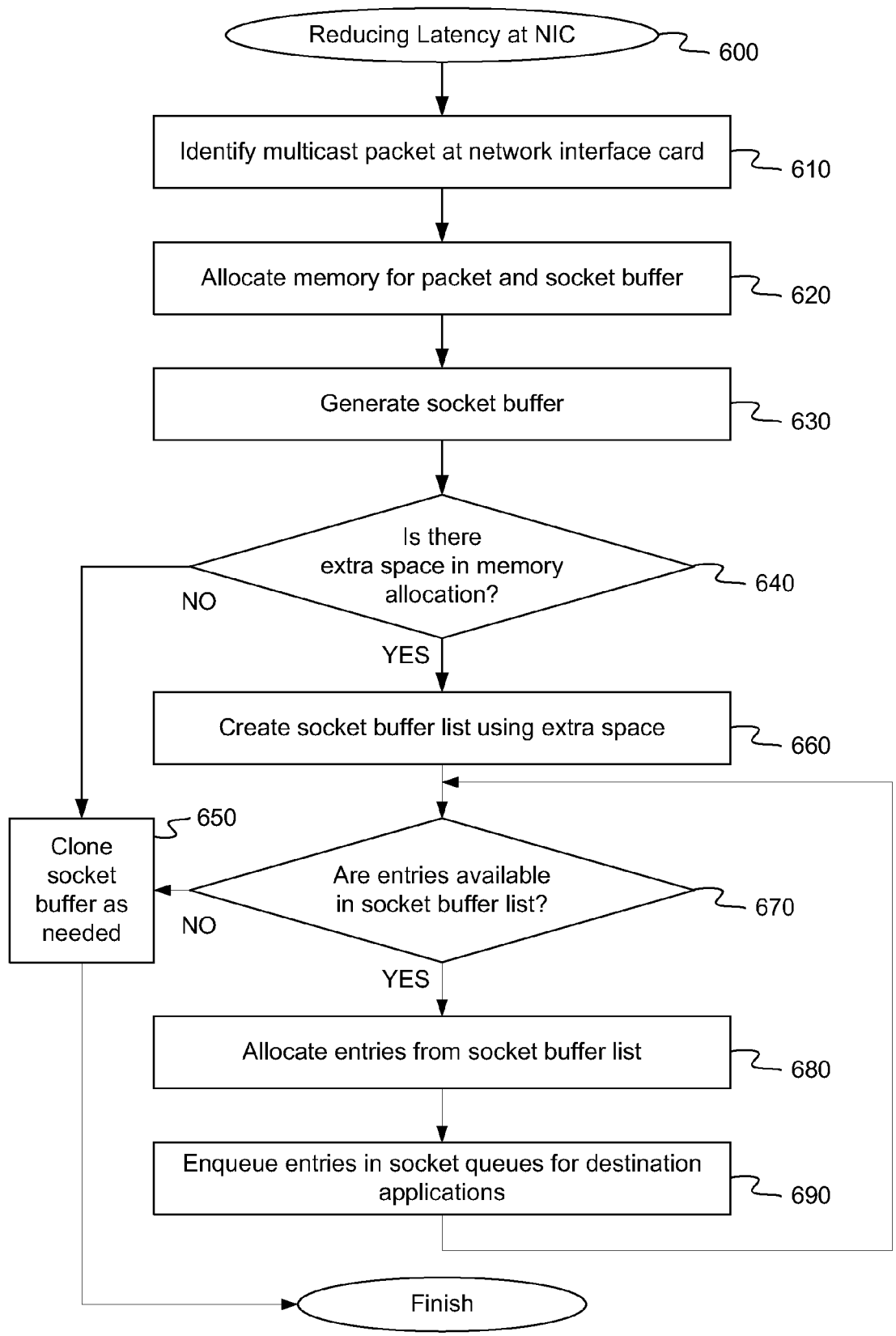
FIG. 6 is a flow diagram illustrating a method for reducing latency in multicast traffic reception, according to an embodiment.

FIG. 6 is a flow diagram illustrating a method for reducing latency in multicast traffic reception according to an embodiment of the present invention. The method 600 may be performed by processing logic that comprises hardware (e.g., circuitry, dedicated logic, programmable logic, microcode, etc.), software (e.g., instructions run on a processing device to perform hardware simulation), or a combination thereof. The method 600 can make opportunistic use of internally fragmented storage by creating a socket buffer list using extra space in a memory allocation. In one embodiment, method 600 may be performed by latency reducer 135, 235, 335 as shown in FIGS. 1-3.

Referring to FIG. 6, at block 610, method 600 identifies a multicast data packet at a network interface card, such as network interface card 210. The data packet may be received over a network 130 from some other network device 120. The data packet may be any packet containing data, such as for example, an Internet Protocol (IP) packet. In another embodiment, the data packet may be a non-multicast packet that has only a single destination within computing device 100. At block 520, method 500 allocates memory for the received data packet and any corresponding metadata, such as a socket buffer. In one embodiment, slab allocation module 230 may receive a request for memory allocation specifying the needed memory size for the frame data 422. Slab allocation module 230 may allocate a location in memory (e.g., slab allocation 420) having a predetermined fixed size that is large enough to accommodate the received packet and its metadata (e.g., frame data 422 and shared SKB information 424). Since the allocation 420 has a fixed size, there may be a leftover amount of extra space 426 in the allocation 420.

At block 630, method 600 may generate a socket buffer 410 containing metadata corresponding to frame data 422. Socket buffer 410 may contain metadata, such as for example, a head and tail location of the corresponding frame data 422, a listhead and other information. The listhead may include pointers, such as next and previous pointers, that may be used as socket queue objects in socket queues 265, 267. Socket buffer handling module 340 may also generate shared socket buffer information 424. In certain embodiments, where multiple socket buffers are generated, the shared socket buffer information 424 contains additional metadata used and managed by the operating system to provide safe access to frame data 422 when the multiple socket buffers are all pointing to the same frame data 422 at once. In one embodiment, shared SKB information 424 is located in a memory allocation immediately adjacent to frame data 422.

At block 640, method 600 determines if there is any extra space 426 in the slab allocation 420 allocated at block 620. Memory allocation handling module 342 may query slab allocation module 230 to determine the size of the slab allocation 420. Memory allocation handling module 342 may also identify the size of frame data 422 and shared SKB information 424 from socket buffer handling module 340. By subtracting the size of the frame data 422 and shared SKB information 424 from the size of slab allocation 420, memory allocation handling module 342 can identify the size of extra space 426, if any.

If at block 640, method 600 determines that there is no extra space 426 in the memory allocation 420, at block 650, method 600 may clone socket buffer 410, as needed. The operating system of computing device 110 may make a copy of socket buffer 410 for each socket 260, 262 that is subscribed to the multicast group.

If at block 640, method 600 determines that there is extra space 426 in the memory allocation 420, at block 660, method 600 creates a socket buffer list 500 using extra space 426. socket buffer list management module 344 may format extra space 426 to generate socket buffer list 500. socket buffer list management module 344 may create entry count value 502, socket buffer pointer 504 and one or more socket buffer list entries 506.

At block 670, method 600 determines if there are entries available in socket buffer list 500. socket buffer list management module 344 may read a value from socket buffer list 500, such as entry count value 502. Entry count value 502 may include a representation of a number of available entries 506 in socket buffer list 500. Since the size of socket buffer list 500 is known (i.e., the size of the extra space 426 determined by memory allocation handling module) and each entry 506 has a fixed format and size, the number of possible entries in socket buffer list 500 can be determined. As new entries are added to socket buffer list 500, the value of entry count 502 is decremented to reflect the number of remaining entries in the queue. If at block 670, method 600 determines that there are no entries available in the socket buffer list 500, at block 650, method 600 may clone socket buffer 410, as described above.

If at block 670, method 600 determines that there are entries 506 available in socket buffer list 500, at block 680, method 600 allocates an entry 506 from socket buffer list 500 to each socket 260, 262 that is subscribed to the multicast group and at block 690, method 600 may enqueue the entries in socket queues 265, 267 for the destination applications. Socket buffer list management module 344 may generate a key value 520, a next value 522, and a previous value 524 for each entry 506. Key value 520 may include a mapping value to identify the socket queue, such as socket queue 265 or 267, to which the entry 506 has been assigned. Upon being added to a socket queue 265, 267, socket buffer list management module 344 may write a value to next 522 and previous 524 representing the adjacent socket queue objects in the socket queue 265, 267. Applications 270, 272 associated with the sockets 260, 262 and socket queues 265, 267 may dequeue the entries 506 to perform application specific processing on the associated socket buffer 410 and frame data 422. Blocks 670, 680 and 690 may be repeated for each instance where a socket requires a socket queue entry for the multicast packet.

Figure 7:
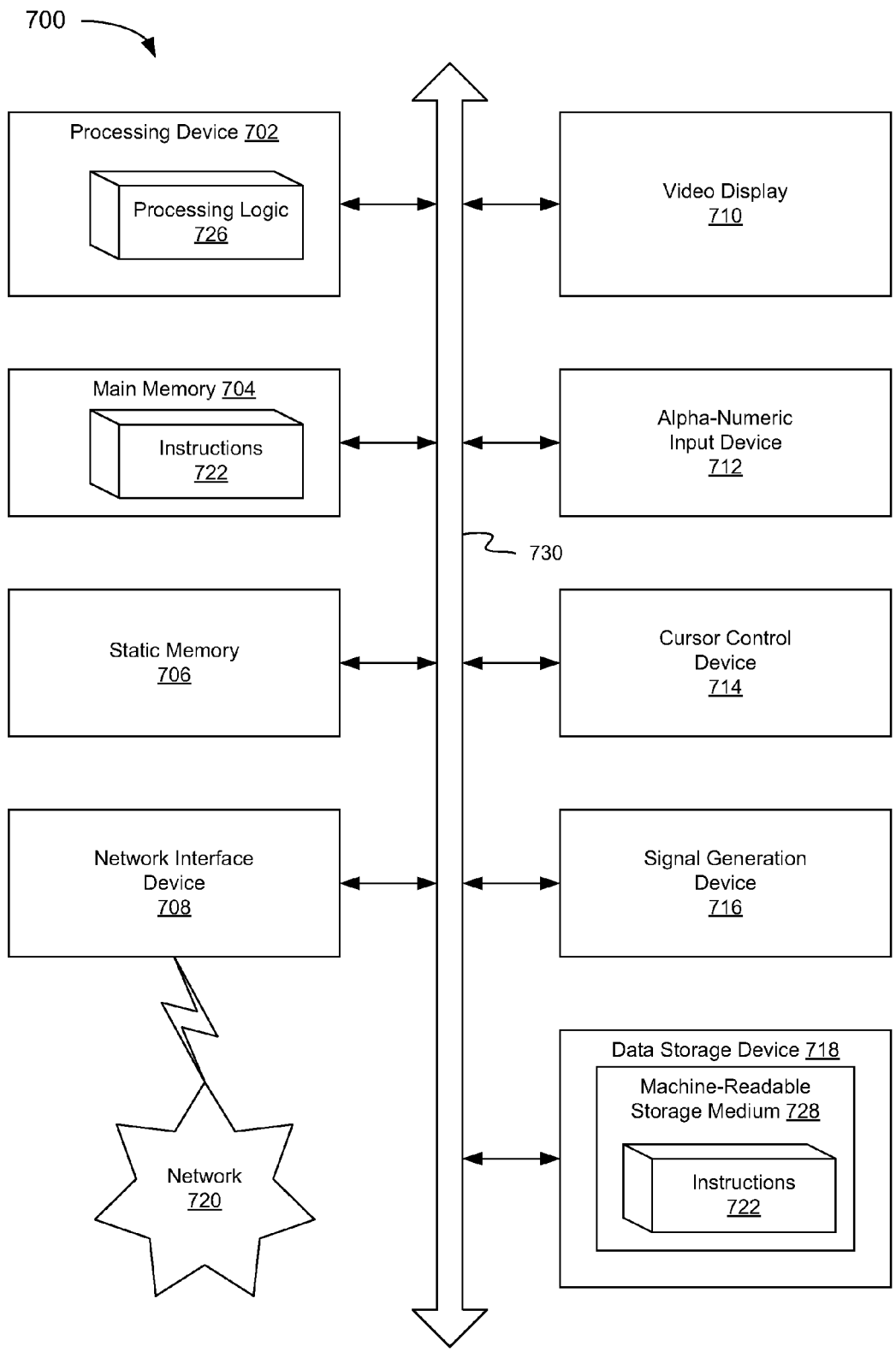
FIG. 7 is a block diagram illustrating one embodiment of a computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a computing device, such as computing device 110, running latency reducer 135.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-accessible storage media. The instructions 722 may further be transmitted or received over a network 720 via the network interface device 708.

The machine-readable storage medium 728 may also be used to store instructions to perform a method for reducing latency in multicast traffic reception, as described herein. While the machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
    receiving, by a processing device, one or more packets including at least one multicast network data packet addressed to a plurality of applications;
    identifying the multicast network data packet;
    allocating memory having a fixed size to store the multicast network data packet;
    determining whether there is free space in the memory allocation;
    responsive to determining there is free space in the memory allocation, the method further comprising:
        identifying the free space in the memory allocation, the free space comprising a difference between the fixed size of the memory allocation and a size of the multicast network data packet;
        formatting the free space in the memory allocation for a socket buffer list;
        creating, by the processing device, the socket buffer list for the multicast network data packet in the free space in the memory allocation in view of the formatting, the socket buffer list comprising a count value representing a number of available entries in the socket buffer list, a pointer to a socket buffer corresponding to the multicast network data packet, and a plurality of entries wherein the plurality of entries are used as socket queue objects for the plurality of applications to perform application specific processing on the associated multicast network data packet; and
        in response to a new entry added to the socket buffer list, decrementing the count value to reflect a number of remaining entries in the socket queue; and
    responsive to determining there is no free space in the memory allocation, the method further comprising:
        cloning the socket buffer; and
        enqueuing a copy of the socket buffer in a socket queue associated with each of the plurality of applications.

2. The method of claim 1, wherein the socket buffer comprises metadata associated with the multicast network data packet.

3. The method of claim 1, wherein each entry of the plurality of entries in the socket buffer list comprises a key mapping value to identify a socket queue associated with one of the plurality of applications, a next pointer value to identify a subsequent object in the socket queue, and a previous pointer value to identify a prior object in the socket queue.

4. The method of claim 3, wherein each entry of the plurality of entries in the socket buffer list is enqueued in a socket queue associated with one of the plurality of applications, wherein the application may perform application specific processing on the multicast network data packet.

5. A system comprising:
    a processing device; and
    a memory operatively coupled to the processing device, the processing device to:
        receive one or more packets including at least one multicast network data packet addressed to a plurality of applications;
        identify the multicast network data packet;
        allocate memory having a fixed size to store the multicast network data packet;
        determine whether there is free space in the allocated memory;
        responsive to determining there is free space in the allocated memory, the processing device further to:
            identify the free space in the memory allocation, the free space comprising a difference between the fixed size of the memory allocation and a size of the multicast network data packet;
            format the free space in the memory allocation for a socket buffer list;
            create the socket buffer list for the multicast network data packet in the free space in the memory allocation in view of format, the socket buffer list comprising a count value representing a number of available entries in the socket buffer list, a pointer to a socket buffer corresponding to the multicast network data packet, and a plurality of entries wherein the plurality of entries are used as socket queue objects for the plurality of applications to perform application specific processing on the associated multicast network data packet; and
            in response to a new entry added to the socket buffer list, decrement the count value to reflect a number of remaining entries in the socket queue; and
        responsive to determining there is no free space in the memory allocation, the processing device further to:
            clone the socket buffer; and
            enqueue a copy of the socket buffer in a socket queue associated with each of the plurality of applications.

6. The system of claim 5, wherein the socket buffer comprises metadata associated with the multicast network data packet.

7. The system of claim 5, wherein each entry of the plurality of entries in the socket buffer list comprises a key mapping value to identify a socket queue associated with one of the plurality of applications, a next pointer value to identify a subsequent object in the socket queue, and a previous pointer value to identify a prior object in the socket queue.

8. The system of claim 7, wherein each entry of the plurality of entries in the socket buffer list is enqueued in a socket queue associated with one of the plurality of applications, wherein the application may perform application specific processing on the multicast network data packet.

9. A non-transitory machine-readable storage medium storing instructions which, when executed, cause a processing device to:
receive, by the processing device, one or more packets including at least one multicast network data packet addressed to a plurality of applications;
identify the multicast network data packet;
allocate memory having a fixed size to store the multicast network data packet;
determine whether there is free space in the allocated memory;
responsive to determining there is free space in the allocated memory, the processing device further to:
identify the free space in the memory allocation, the free space comprising a difference between the fixed size of the memory allocation and a size of the multicast network data packet;
format the free space in the memory allocation for a socket buffer list;
create, by the processing device, the socket buffer list for the multicast network data packet in the free space in the memory allocation in view of the formatting, the socket buffer list comprising a count value representing a number of available entries in the socket buffer list, a pointer to a socket buffer corresponding to the multicast network data packet, and a plurality of entries wherein the plurality of entries are used as socket queue objects for the plurality of applications to perform application specific processing on the associated multicast network data packet; and
in response to a new entry added to the socket buffer list, decrement the count value to reflect a number of remaining entries in the socket queue; and
responsive to determining there is no free space in the memory allocation, the processing device further to:
clone the socket buffer; and
enqueue a copy of the socket buffer in a socket queue associated with each of the plurality of applications.

10. The non-transitory machine-readable storage medium of claim 9, wherein the socket buffer comprises metadata associated with the multicast network data packet.

11. The non-transitory machine-readable storage medium of claim 9, wherein each entry of the plurality of entries in the socket buffer list comprises a key mapping value to identify a socket queue associated with one of the plurality of applications, a next pointer value to identify a subsequent object in the socket queue, and a previous pointer value to identify a prior object in the socket queue.

12. The non-transitory machine-readable storage medium of claim 11, wherein each entry of the plurality of entries in the socket buffer list is enqueued in a socket queue associated with one of the plurality of applications, wherein the application may perform application specific processing on the multicast network data packet.

* * * * *